No. 792,945.

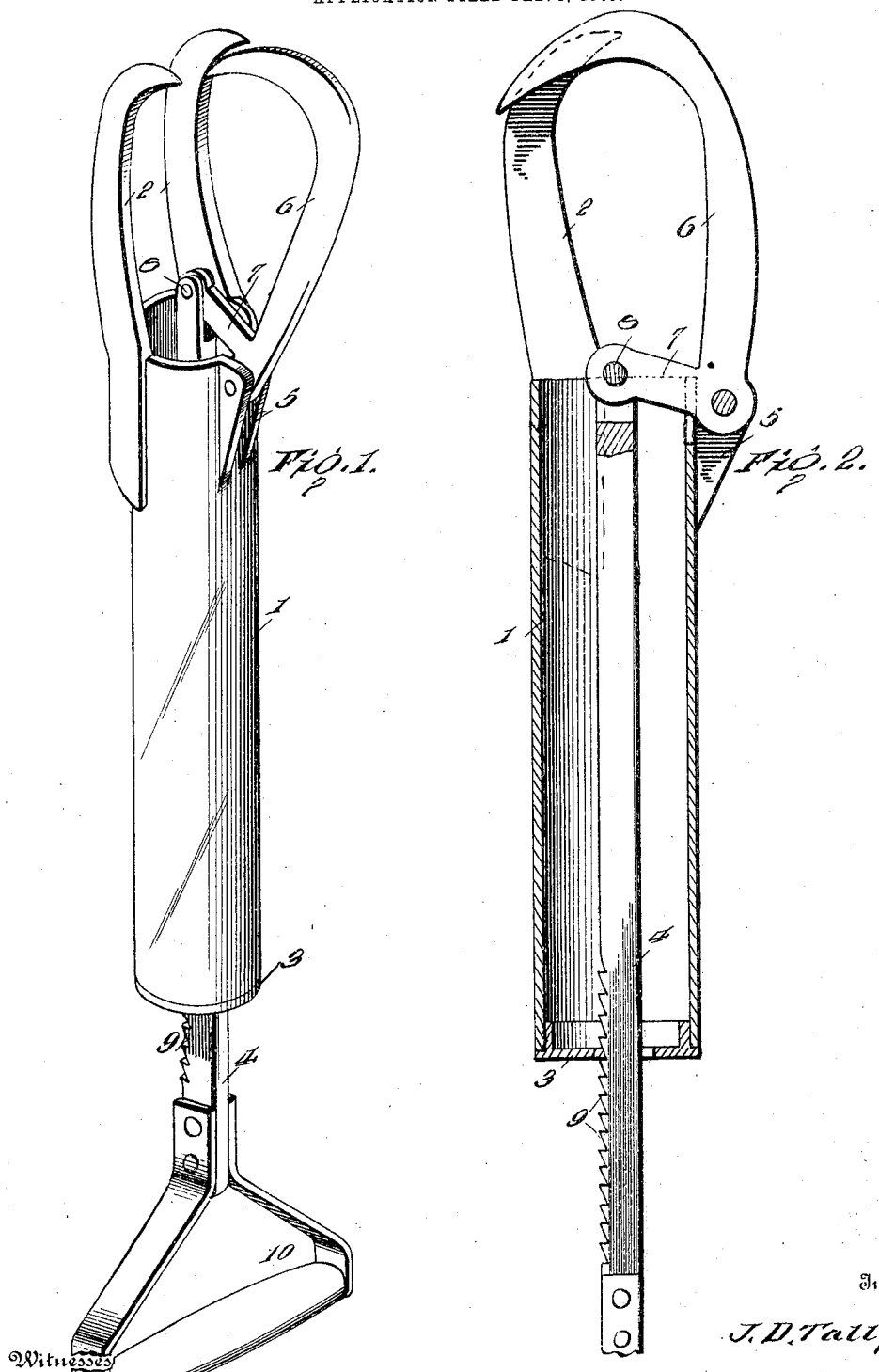

Patented June 20, 1905.

UNITED STATES PATENT OFFICE.

JOHN D. TALLY, OF THORNTON, TEXAS.

MEAT-HOOK.

SPECIFICATION forming part of Letters Patent No. 792,945, dated June 20, 1905.

Application filed February 3, 1905. Serial No. 244,010.

*To all whom it may concern:*

Be it known that I, JOHN D. TALLY, a citizen of the United States, residing at Thornton, in the county of Limestone and State of Texas, have invented certain new and useful Improvements in Meat-Hooks, of which the following is a specification.

This invention relates to an implement whereby meats and like articles may be handled without soiling the fingers, being of special advantage in grocery stores where smoked meats are on sale and cutting is required by the customer.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of an implement embodying the invention. Fig. 2 is a central longitudinal section thereof.

Corresponding and like parts are referred to in the following description and indicated in both views of the drawings by the same reference characters.

In its organization the implement comprises a body 1, provided at one end with hooks 2, attached thereto in any determinate way or forming a part thereof, as desired. The opposite end of the body 1 is closed by means of a plug 3, through which the operating rod or bar 4 extends. The body 1 may be of any cross-sectional outline and desired length and is hollow or tubular to admit of a free working of the operating rod or bar 4, which passes therethrough. A lug 5 is located at the end of the body provided with the hooks 2 and at a point diametrically opposite thereto and is notched in its outer end to receive the inner end of the pivoted hook 6, which coöperates with the hooks 2 when gripping the article to be held. An arm 7 extends inward from the pivoted end of the hook 6 and is connected to the proximal end of the rod or bar 4 by means of a pin 8 or kindred fastening. The end portion of the body 1 opposite to the lug 5 is notched to correspond with the notch in said lug to receive the arm 7, thereby admitting of the free movement of the pivoted hook 6.

The operating rod or bar 4 is provided near its outer end with a series of notches 9 to form a plurality of teeth which are adapted to make interlocking connection with the plug 3 or closed end of the body 1 and hold the part 4 and pivoted hook 6 in the required position.

A handle 10 is provided at the outer end of the rod or bar 4 and comprises a bail and a grip fitted to the cross-piece of said bail. The end portions of the bail come together and embrace opposite sides of the projecting end of the rod or bar 4 and are riveted or otherwise secured thereto.

The hooks 2 are preferably in line with the body 1, and their hooked terminals project toward the pivoted hook 6, whereas the corresponding hooked terminal of the part 6 projects toward the fixed hooks 2. When the operating rod or bar 4 is moved inward, the outer end of the pivoted hook 6 is moved away from the hooks 2, thereby enabling a side of bacon or other article to be passed between the companion hooks 2 and 6, after which an outward pull upon the rod or bar 4 causes the hook 6 to move inward and in conjunction with the hooks 2 securely and firmly grip the article. Loosening of the grip of the hooks upon an article is prevented by moving the rod or bar 4 so as to bring one of its notches 9 into engagement with the plug 3. When it is required to release the article held between the hooks 2 and 6, the rod or bar 4 is disengaged from the plug 3 and moved inward, thereby causing the hooks to separate and release their hold, as will be readily comprehended.

Having thus described the invention, what is claimed as new is—

In combination, a hollow body, fixed hooks at one end thereof, a companion pivoted hook having an inwardly-extended arm, a plug closing the opposite end of the body, and an operating rod or bar passed through said plug and body and having pivotal connection with the inner arm of said pivoted hook and provided near its outer end with a series of notches to make interlocking connection with the plug to hold the pivoted hook in the required position.

In testimony whereof I affix my signature in presence of two witnesses.

JOHN D. TALLY. [L. S.]

Witnesses:
R. C. RANDALL,
A. P. ELLIS.